US006627237B1

(12) United States Patent
Naito

(10) Patent No.: US 6,627,237 B1
(45) Date of Patent: Sep. 30, 2003

(54) FROZEN FOODS AND PROCESS FOR PRODUCING THE SAME

(75) Inventor: Yoshinori Naito, Koga (JP)

(73) Assignee: Chisso Corporation, Tokyo (JP)

( * ) Notice: Subject to any disclaimer, the term of this patent is extended or adjusted under 35 U.S.C. 154(b) by 0 days.

(21) Appl. No.: 09/622,361

(22) PCT Filed: Feb. 15, 1999

(86) PCT No.: PCT/JP99/00655

§ 371 (c)(1),
(2), (4) Date: Aug. 16, 2000

(87) PCT Pub. No.: WO99/40804

PCT Pub. Date: Aug. 19, 1999

(30) Foreign Application Priority Data

Feb. 16, 1998 (JP) ............................................. 10-074800

(51) Int. Cl.⁷ .............................. A23L 3/37; A23L 3/358
(52) U.S. Cl. ......................... 426/92; 426/302; 426/303; 426/524; 426/576; 426/654
(58) Field of Search .......................... 426/92, 302, 303, 426/310, 654, 524, 576

(56) References Cited

U.S. PATENT DOCUMENTS 5,885,639 A * 3/1999 Judkins et al. .............. 426/303
5,939,112 A * 8/1999 Katayama et al. ............. 426/74
5,965,191 A * 10/1999 Katayama et al. .......... 426/643
6,033,697 A * 3/2000 Judkins et al. ............... 426/102
6,200,619 B1 * 3/2001 Nakamura et al. .......... 426/321

* cited by examiner

Primary Examiner—Nina Bhat
(74) Attorney, Agent, or Firm—Birch, Stewart, Kolasch & Birch, LLP

(57) ABSTRACT

The frozen food or food material includes a food or food material processed with from 0.1% by weight to 5% by weight of an alkali metal halide or an alkali earth metal halide, from 0.01% by weight to 0.5% by weight of an alkali metal bicarbonate or an alkali earth metal bicarbonate, from 0.0005% by weight to 0.05% by weight of an organic acid, and from 0.05% by weight to 10% by weight of gelatin, and from 0.05% by weight to 10% by weight of polylysine, as needed, each based on the weight of the food or food material, or a mixture of two or more. The frozen food or food material can be stored in cold storage for a prolonged period of time, and the original taste or flavor of the food or food material is not spoiled upon thawing or unfreezing the frozen food or food material.

15 Claims, No Drawings

FROZEN FOODS AND PROCESS FOR PRODUCING THE SAME

CROSS-REFERENCE TO RELATED APPLICATION

The entire disclosure of Japanese Patent Application No. 10-74800 filed on Feb. 16, 1998 and International Application No. PCT/JP99/00655 filed on Feb. 15, 1999, including specification, claims and summary is incorporated by reference in its entirety.

BACKGROUND OF THE INVENTION

1. FIELD OF THE INVENTION

The present invention relates to frozen food and a process for preparing the same. More particularly, the present invention relates to frozen foods and a process for the preparation of frozen foods, including particularly fresh and raw fish flesh and shell and meat, which can remarkably improve taste and flavor of such foods, even after such foods or food materials or processed foods or food materials prepared by processing such foods or food materials was defrosted.

2. DESCRIPTION OF THE RELATED ART

In order to store foods or food materials for a long period of time, various difficulties have to be solved. Foods or food materials can be stored at ambient temperature for a very limited and short period of time and it is generally impossible to store foods or food materials for a long period of time even at low temperature. There is the limit in storing foods or food materials for long even at temperature lower than 0° C.

In order to allow storage of foods or food materials for a certain period of time particularly at ambient temperature and in some cases at low temperature, it is also required to prevent the decaying of foods or food materials.

The decay of foods or food materials is caused by the growth of organisms, such as putrefactive or decaying bacteria, fungi, etc., in foods or food materials. The growth of such organisms in foods or food materials may greatly depend upon the water activity in foods or food materials as well as upon conditions such as temperature, etc. in surroundings of storage of foods or food materials. The growth of organisms including putrefactive bacteria, etc. is accelerated at ambient temperature or at temperature higher than ambient temperature, so that the speed at which foods or food materials decay becomes faster as temperature becomes higher, and foods or food materials may accordingly become likely to decay at a faster speed and for a shorter period of time. On the other hand, while foods or food materials are stored at low temperature at which organisms are unlikely to grow, the multiplication of organisms can be controlled and the decay of foods and food materials can be prevented. However, the storage of foods or food materials at such low temperature may cause new problems upon thawing frozen or refrigerated foods or food materials, as will be described hereinafter.

Moreover, unless foods or food materials keep the water activity at a predetermined level, organisms including putrefactive bacteria etc. cannot grow in foods or food materials so that the decay of foods or food materials may little be caused in such a dry state. Therefore, the water activity in foods or food materials has to be controlled at a level lower than a predetermined one in order to prevent the decay of foods or food materials by putrefactive bacteria and so on.

Currently, the most common and useful way of controlling the water activity in foods or food materials at a low level may include a process of adding an additive such as a salt and/or a saccharide. As a matter of course, however, the addition of such an additive provides the foods or food materials with the taste or flavor originated from the additive. The taste originated from the additive can little be perceived, that is, that the taste or flavor of the foods or food materials cannot be spoiled by the addition of the additive thereto, if the additive would be used in a very small amount. The addition of such a very small amount of a salt and/or a saccharide, however, cannot achieve the object of controlling the water activity in foods or food materials at a low level. And this may result in a decrease of the effect of preventing the decaying of foods or food materials. This also indicates that, as such a salt and/or a saccharide have or has to be added in a certain amount in order to prevent the decay of foods or food materials, the taste originated therefrom is also provided to the foods or food materials and as a consequence the own taste and flavor thereof might be spoiled to some extent. In this sense, such an additive including a salt, saccharide or the like cannot be added to fresh or raw food materials in order to control the water activity in the foods or food materials, as long as it is eaten in a fresh or raw state, so that the process for adding the additive to such fresh or raw foods or food materials cannot be adopted for this purpose.

Currently, only the way of storing fresh or raw foods or food materials for a certain period of time without causing decaying the foods or food materials and adding any salt, saccharide, or the like thereto is to freeze or refrigerate fresh or raw foods or food materials or keep them in cold storage. The biggest defect relating to the way of freezing or refrigerating fresh or raw foods, etc., however, resides in that the frozen or refrigerated foods etc. become dry or cause drying to whiteness or whitening or cell-decomposing particularly on the surfaces of the frozen foods or food materials during freezing or cold storage as well as that the thawing or unfreezing of the frozen foods or food materials may often spoil the taste or flavor of the thawed or unfrozen foods or food materials. In order to lessen the defect of the storage process for freezing or refrigerating such fresh or raw foods or food materials as much as possible, it is required to strictly manage conditions including temperature for freezing or refrigerating or keeping in cold storage such fresh or raw foods or food materials. The strict management of the frozen or cold storage, however, requires a large amount of expenses and labor. Moreover, even if frozen or refrigerated foods or food materials would be stored under such strictly managed conditions by using such a large amount of expenses and labor and it would be thawed carefully under strictly managed conditions, the problem may remain still unsolved that the original taste or flavor etc. of foods or food materials may be spoiled unavoidably by thawing or unfreezing the frozen or refrigerated foods or food materials.

The problem with the spoilage of the taste, flavor or the like of the thawed or unfrozen foods or food materials, however, is the issue relating to the mechanism of freezing or refrigerating foods or food materials, and the issue cannot be completely solved simply by adding an additive including preservative or the like.

In order to solve or improve the problem with the drying to whiteness or the whitening of frozen or refrigerated foods or food materials during storage by the freezing or refrigerating process, there have been used, for examples, ways of adding a variety of additives to foods or food materials or spraying a solution containing such additives thereonto or dipping them in such a solution. The storage of foods or food materials by means of the freezing or refrigerating process by using such additives, however, is not always effective and satisfactory.

Further, various attempts have been made to improve storage performance of foods or food materials by coating the foods or food materials with a proteinaceous gel including gelatin, collagen, etc. or the like and then freezing or refrigerating the coated foods or food materials. These processes can improve the storage performance of foods or food materials to some extent.

When the foods or food materials processed by freezing or refrigerating them in the above manner are thawed or unfrozen, however, the problem with the spoilage of the taste or flavor of the foods or food materials cannot be solved completely or satisfactorily.

Moreover, it is reported that, in order to improve the storage performance of foods or food materials by coating them with gelatin or the like in the above manner, a solution containing gelatin has to be used in an amount as high as at least 1% by weight. The coating with such a high concentration of gelatin or the like naturally leads to spoiling the taste and flavor of the foods or food materials upon thawing or unfreezing the frozen or refrigerated foods or food materials.

Various attempts have so far been made to solve the problems present in the conventional processes for freezing or refrigerating foods or food materials.

One of the attempts is to use polylysine as a food preservative, which is one of naturally occurring amino acid polymers and which is known as a food additive having a wide antimicrobial spectrum against a variety of organisms.

It is extremely useful to use polylysine having a wide-range antimicrobial spectrum as a food preservative agent in order to prevent the decay of foods or food materials during storage for a long period of time. Polylysine itself, however, does not function preventing the spoilage of the taste or flavor of foods or food materials upon unfreezing or thawing the frozen or refrigerated foods or food materials. Moreover, polylysine is expensive so that it is less economic to use polylysine solely for these purposes. It is therefore suggested that polylysine is used together with a different antimicrobial agent as a combination agent.

A polylysine-gelatin mixture formulation for use in storing foods or food materials is proposed as such a combination agent, which is composed of polylysine and gelatin as major components (Japanese Patent Publication (laid-open) No. 9-98,754).

It is disclosed therein that the polylysine-gelatin mixture formulation can prolong the period of time during which a natural taste or flavor of foods or food materials is kept as it is and without being spoiled, compared to the case where polylysine or gelatin or a material decomposed therefrom is used solely.

The polylysine-gelatin mixture formulation, however, cannot satisfactorily prevent the spoilage of the taste or flavor of foods or food materials processed therewith, when used solely, due to the breakdown of cells of the foods or food materials by unfreezing or thawing the frozen or refrigerated foods or food materials.

SUMMARY OF THE INVENTION

Therefore, the present invention has the object to provide frozen foods or food materials that can keep their original taste and flavor without being greatly spoiled by unfreezing or thawing the frozen foods or food materials after cold storage for a long period of time. The present invention has another object to provide a process for preparing such frozen foods or food materials.

In order to achieve the objects as described above, the present invention provides frozen foods or food materials comprising foods or food materials and an alkali metal halide or an alkali earth metal halide, an alkali metal bicarbonate or an alkali earth metal bicarbonate, an organic acid and gelatin.

Further, the present invention provides frozen foods or food materials further comprising polylysine in addition to the components as described above.

Organisms may grow while unfrozen or thawed foods or food materials are placed or stored in such a non-freezing state for a certain period of time after the frozen foods or food materials were unfrozen or thawed. The polylysine can prevent the growth of organisms including decaying bacteria and so on in foods or food materials.

Moreover, the present invention provides a process for preparing frozen foods or food materials containing an alkali metal halide or an alkali earth metal halide, an alkali metal bicarbonate or an alkali earth metal bicarbonate, an organic acid and gelatin, the process comprising the food-processing step of processing a food or a food material to be frozen or refrigerated with an alkali metal halide or an alkali earth metal halide, an alkali metal bicarbonate or an alkali earth metal bicarbonate, an organic acid and gelatin; and a food-freezing step of freezing or refrigerating the processed food or food materials in cold storage.

The frozen foods according to the present invention can present the great advantages that they can be stored in a cold state for a prolonged period of time as well as that the original taste or flavor of the foods or food materials is little spoiled upon unfreezing or thawing the frozen or refrigerated foods or food materials. The freezing process according to the present invention can prevent a decrease in the taste or flavor of the thawed or unfrozen foods or food materials due to drying to whiteness or whitening of foods or food materials during cold storage, the breakdown of cells by thawing or unfreezing or for other reasons, even if the foods or food materials are unfrozen or thawed after cold storage for a long period of time.

Other objects, features and advantages of the present invention will be apparent in the course of the specification and appended claims.

DETAILED DESCRIPTION OF THE PREFERRED EMBODIMENTS

The frozen or refrigerated foods or food materials according to the present invention can be prepared by processing foods or food materials to be frozen or refrigerated with an alkali metal halide or an alkali earth metal halide, an alkali metal bicarbonate or an alkali earth metal bicarbonate, an organic acid, and gelatin and polylysine, if needed or advisable.

Foods or food materials for use with the present invention are not limited to particular ones and any food or food material may be used as long as it is frozen and thawed before use. Foods or food materials may include, for example, fresh or raw foods or food materials including vegetables, fish, shell, animal meats, and so on, processed foods or food materials including edible grains, cereals, grain or cereal products including noodles, dishes, and so on. Foods or food materials applicable to the present invention are not limited to particular types of foods or food materials, and the present invention can be applied to any type of foods or food materials as long as they can be frozen and then thawed for use or application.

The alkali metal halide or the alkali earth metal halide for use as a component of the frozen foods according to the present invention may include, for example, a halide of sodium, potassium, magnesium, etc., such as sodium chloride, potassium chloride, magnesium chloride, and so on. The alkali metal halide or the alkali earth metal halide may be used singly or in combination with two or more. The preferred example of the alkali metal halide or the alkali earth metal halide is sodium chloride.

The alkali metal halide or the alkali earth metal halide may be used in an amount ranging typically from approximately 0.1% by weight to 5% by weight, preferably from approximately 0.2% by weight to 3% by weight, and more preferably from approximately 0.3% by weight to 2% by weight, with respect to the total weight of the food or food material, although the amount of the alkali metal halide or the alkali earth metal halide may vary with the kind or type of the raw material or with other conditions.

The alkali metal bicarbonate or the alkali earth metal bicarbonate for use as a component of the frozen foods according to the present invention may include, for example, sodium bicarbonate, potassium bicarbonate, and so on. The alkali metal bicarbonate or the alkali earth metal bicarbonate may be used singly or in combination with two or more. The preferred example of the alkali metal bicarbonate or the alkali earth metal bicarbonate is sodium bicarbonate.

The alkali metal bicarbonate or the alkali earth metal bicarbonate may vary with the kind or type of the foods or food materials to which it is applied or with other conditions, and the alkali metal bicarbonate or the alkali earth metal bicarbonate may be used in an amount ranging typically from approximately 0.01% by weight to 0.5% by weight, preferably from approximately 0.05% by weight to 0.3% by weight, and more preferably from approximately 0.1% by weight to 0.2% by weight, with respect to the total weight of the food or food material.

In addition to the components as described above, the frozen foods or food materials according to the present invention contain the organic acid. The organic acid for use in the present invention may include, for example, acetic acid, lactic acid, adipic acid, malic acid, citric acid, fumaric acid, oxalic acid or the like. The organic acid may be used singly or in combination with two or more. The preferred examples of the organic acids are acetic acid, citric acid, lactic acid, and a mixture of two or more.

The amount of the organic acid to be contained in the frozen foods of this invention may range typically from approximately 0.0005% by weight to 0.05% by weight and preferably from approximately 0.001% by weight to 0.01% by weight based on the weight of the food or food material The amount of the organic acid may be varied in accordance with the type of the food or food material.

The other component for use with the frozen foods according to the present invention is gelatin. Any kind of gelatin can be used as long as it can be typically used as a food additive. As such gelatin, a purified gelatin that is purified to a taste-free or tasteless state is particularly useful.

The amount of gelatin may vary with the kind or type of the food or food material, the kind or type of gelatin, etc. or with other conditions, and gelatin may be used in an amount ranging typically from approximately 0.05% by weight to 10% by weight and preferably from approximately 0.1% by weight to 5% by weight, with respect to the weight of the food or food material.

The frozen foods according to the present invention may contain polylysine as needed or advisable. The greatest advantage produced by the use of polylysine resides in the fact that the multiplication of organisms including decaying bacteria or the like can be greatly controlled, compared to the case where no polylysine is applied. In the case where no polylysine is used, decaying bacteria and other organisms may naturally grow faster in a shorter period of time in unfrozen or thawed foods or food materials after they are unfrozen or thawed and then placed or stored for a certain period of time.

Polylysine to be used optionally for the present invention is not limited to a particular type of polylysine as long as it can be added to foods or food materials. Particularly preferred is $\epsilon$-polylysine that is a naturally originated food additive.

The amount of polylysine to be added to the frozen foods according to the present invention may typically vary with the kind or type of foods or food materials to be processed, the kind or type of gelatin or with other conditions, and it may range typically from approximately 0.05% by weight to 10% by weight and preferably from approximately 0.1% by weight to 5% by weight, with respect to the weight of the food or food material.

The frozen foods according to the present invention may be prepared by processing a food or food material to be frozen with a necessary amount of the components in the following manner.

As a food or food material to be frozen and stored in a frozen state in accordance with the process of the present invention, there may be used a food or food material in a fresh or raw state or in a non-cooked state, that is, in such a state that it is not prepared or cooked, or in a processed or cooked state, that is, in such a state that it is cooked or prepared e.g. by heating. More specifically, for instance, a food or food material, including animal meat, e.g., beef, pork, chicken, etc., fish, e.g., tuna, sea bream, squid, octopus, shrimps, etc., shell, vegetables, and so on may be processed by the process according to the present invention without pre-processing, including cooking, e.g., processing by heating, etc., or simply by cutting it into appropriate sizes or shapes.

The food or food material pre-processed as needed may be processed with the alkali metal halide or alkali earth metal halide, the alkali metal bicarbonate or alkali earth metal bicarbonate, the organic acid, and gelatin and, if needed, polylysine, in the manner as will be described hereinafter.

The frozen foods or food materials of the present invention may be prepared in accordance with any conventional method that can be applied to the process for preparing the frozen foods or food materials. The frozen foods or food materials may be prepared, for instance, by pre-processing a food or food material, as needed, then processing it with each of the components one after another, and freezing or refrigerating it. Alternatively, the frozen foods or food materials may be prepared, for instance, by pre-processing a food or food material, as needed, then processing it with a mixture of two components or more, and freezing or refrigerating it.

As the process for processing the food or food material with the components into the frozen food or food material according to the present invention, there may be used any conventional process for preparing frozen foods as long as it can use food additives and it can be applied to the preparation of the frozen foods or food materials according to the present invention. The process for the preparation of the frozen foods or food materials according to the present invention may comprise, for example, spraying a food or food material as a raw material, pre-processed as necessary or advisable, with a solution containing the components for use in preparing the frozen foods or food materials, or immersing or dipping the raw material in such a solution, removing the liquid therefrom, placing the processed raw material in a bag or container or wrapping it, and then freezing or refrigerating it in cold storage such as a freezer or refrigerator.

The present invention will be described in more detail by way of working examples.

EXAMPLE 1

After 1.5 kg of rice washed with water, it was immersed in 3–3.5 kg of water for one hour and cooked in a conventional way. To the water was added a 5% aqueous solution of a mixture of organic acids containing citric acid at the rate of 10 ml with respect to 1.5 kg of rice.

Immediately after cooking rice, about 300 ml of an aqueous solution containing a mixture of appropriate amounts of vinegar, sodium chloride, mirin (a sweet sake as seasoning) and sugar with 0.5 gram of gelatin was added to the cooked rice, followed by adding an aqueous solution containing about 0.5 gram of polylysine thereto. Thereafter, the cooked rice was mixed well and allowed to stand at room temperature for an appropriate period of time to allow the hot rice to cool. Then, the cooled rice was placed in a refrigerator at −30° C. to −35° C.

EXAMPLE 2

Raw fish (tuna) was processed by cutting the head, internal organs and skin off the fish body and then separating the flesh from the bone and cut or sliced into appropriate shapes and sizes for eating sliced flesh raw as sashimi or sushi. The cuts or slices of the raw fish flesh were immersed in a 2% aqueous solution containing a citric acid mixture, sodium bicarbonate and sodium chloride for 15 minutes. Thereafter, the cuts or slices were taken from the solution, and the liquid was removed therefrom and then dipped into an aqueous solution of gelatin for a very short time. Then, they were placed in a container and stored in a refrigerator at −30° C. to −35° C.

Likewise, raw fish (each of sea bream, squid, octopus, young yellowtail and shrimp) was processed in substantially the same manner as above and stored in a refrigerator at −30° C. to −35° C.

Other raw fish can be processed in substantially the same manner as above as above and stored in a refrigerator at the same temperature.

EXAMPLE 3

Raw fish (octopus) was cooked by pre-processing, e.g., removing the internal organs from the body and cutting or slicing it into appropriate shapes and sizes. The cuts or slices of octopus were immersed in a 2% solution containing a citric acid mixture, sodium bicarbonate and sodium chloride for 15 minutes. They were then taken out from the solution and the liquid on them was removed, followed by dipping them in a gelatin aqueous solution and taking them out therefrom in a short time after dipping. Thereafter, they were stored in a refrigerator at −30° C. to −35° C.

Other fish (each of shrimp, salmon and eel) was likewise cooked in substantially the same manner and stored in a refrigerator at −30° C. to −35° C.

EXAMPLE 4

Cut beef sirloin steak (USTA loin cut) of about 450 grams was immersed in a 2% solution containing a citric acid mixture, sodium bicarbonate and sodium chloride for 15 minutes. After it was taken out from the solution, the liquid on the steak was removed followed by dipping it in a gelatin aqueous solution and taking it out from the solution soon after dipping. The cut was then stored in a refrigerator at −30° C. to −35° C.

EXAMPLE 5

Beef sirloin steak of about 450 grams was cooked on charcoal in a conventional manner. The cooked steak was immersed in an aqueous solution containing a citric acid mixture, sodium bicarbonate and sodium chloride for 15 minutes. After taking out the steak from the solution, the liquid on it was removed and then dipped in a gelatin aqueous solution followed by taking it out soon after dipping. The steak was then stored in a refrigerator at −30° C. to −35° C.

EXAMPLE 6

Egg roll was prepared and cooked in a conventional way, and it was cut into an appropriate size. The cuts of egg roll were then immersed in a 2% aqueous solution of citric acid, sodium bicarbonate and sodium chloride for 15 minutes. After they were separated from the solution, the liquid thereon was removed and they were dipped in an aqueous gelatin solution. The egg roll cuts were then taken out from the solution soon after dipping and stored in a refrigerator at −30° C. to −35° C.

EXAMPLE 7

Spinach of about 200 grams was boiled in water for about two minutes and cut into appropriate sizes. The cut spinach was then immersed in a 2% aqueous solution of a citric acid mixture, sodium bicarbonate and sodium chloride for 2 minutes. After it was taken out from the solution, the liquid on it was removed and the spinach was dipped in a gelatin aqueous solution followed by taking it out soon after dipping. The spinach was then stored in a refrigerator at −30° C. to −35° C.

EXAMPLE 8

Fresh spinach of about 200 grams was cut into an appropriate size and immersed in an aqueous solution containing citric acid, sodium bicarbonate and sodium chloride for 15 minutes. After the spinach cuts were taken out from the solution, the liquid thereon was removed followed by dipping it in an aqueous gelatin solution. The spinach cuts were then taken out from the gelatin solution soon after dipping and stored in a refrigerator at −30° C. to −35° C.

EXAMPLE 9

Each of carrot, green pieces and corn was separately boiled in water and they were equally admixed together. A vegetable mixture of about 300 grams was immersed in an aqueous solution of citric acid, sodium bicarbonate and sodium chloride for 15 minutes. After the vegetable mixture was taken out from the solution, the liquid on them was then removed and the vegetable mixture was dipped in an aqueous gelatin solution. The mixture was then taken out from the solution soon after dipping and then stored in a refrigerator at −30° C. to −35° C.

EXAMPLE 10

Rice was cooked in substantially the same manner as in Example 1 (without placing in cold storage) and softly rolled and shaped into a number of sushi bodies each in the form of a generally quadratic prism. The sliced fish flesh (each of tuna, sea bream, squid, octopus, young yellowtail, shrimp and salmon), each in the form of a sheet or thin plate, was processed in substantially the same manner as in Example 2 (without placing in cold storage) and placed on top of each of the sushi bodies, followed by pressing the rice body and the sliced fish flesh softly so as to attach the sliced fish flesh to the rice body and integrate them into a body as if one body as sushi. The sushi so prepared was then stored in a refrigerator at −30° C. to −35° C.

COOKING EXAMPLE 1

The rice was cooked in substantially the same manner as in Example 1 and stored in a refrigerator at −30° C. to −35° C., for one month, three months and six months, respectively. After the elapse of each of one month, three months and six months, each was thawed with an electronic oven and eaten. As a result, it was found that it tasted good as if the rice of the same quality were cooked right at site.

Moreover, surprisingly, it was found that the cooked rice stored for each of one month, three months and six months caused no turning to white or whitening on the surfaces, while rice cooked in a conventional way caused turning to white or whitening on the surface thereof even upon storage for less than one month. The conventionally cooked rice that caused turning to white and whitening during cold storage tasted significantly poorer than the cooked and frozen rice prepared by the process according to the present invention.

COOKING EXAMPLE 2

The sliced raw fish flesh processed and frozen for one moth as in Example 2 was thawed in an electronic oven and eaten. As a result, surprisingly, it was found that there was no big difference in taste and flavor from raw fish of the same kind that was prepared in substantially the same manner and eaten raw as sashimi.

COOKING EXAMPLE 3

The sliced fish flesh processed and frozen for three month as in Example 3 was thawed in an electronic oven and eaten. It was surprisingly found that there was no big difference in taste and flavor from raw fish of the same kind that was cooked in substantially the same manner and eaten as sashimi.

COOKING EXAMPLE 4

The sirloin steak of beef prepared and frozen for six months as in Example 4 was thawed with an electronic oven and eaten. It was surprisingly found that the taste of the thawed sirloin steak was substantially equal to that of the raw sirloin steak of the same quality cooked in a conventional way. Cooking Examples 5–9

The food materials, each prepared in substantially the same manner as in Examples 5 to 9, inclusive and respectively, were stored for one month, three months and six months. After the elapse of each of one month, three months and six months, they were thawed with an electronic oven and eaten. As a result, it was found that the thawed food materials tasted as equally good as the fresh food materials cooked without cold storage.

COOKING EXAMPLE 10

The sushi prepared and frozen in cold storage for one moth, three months and six months, as in Example 10, was thawed with a vertically two-dimensional electronic oven in order to simultaneously unfreeze sushi as a whole, i.e., the fish flesh and the rice body as one piece. Surprisingly, it was found that the sushi unfrozen in this way tasted as equally good as sushi that was right now prepared from the rice cooked and the fish flesh cut into pieces suited to sushi and eaten soon after rolling the sushi without freezing.

It was further found surprising that the frozen sushi stored in a refrigerator at −30° C. to −35° C. for one month, three months and six months, respectively, caused no turning to white or whitening on the surface of sushi.

EFFECTS OF THE INVENTION

The frozen foods according to the present invention is composed of the addition of a mixture of the alkali metal halide or alkali earth metal halide, the alkali metal bicarbonate or alkali earth metal bicarbonate, and the organic acid with gelatin to foods or food materials. The frozen foods or food materials can be stored for a long period of time while preventing turning to white or whitening of the surfaces of the foods or food materials. Moreover, the original taste or flavor of the foods or food materials is not spoiled upon thawing or unfreezing the frozen or refrigerated foods or food materials after storage for a long period of time.

The frozen foods according to the present invention may further contain polylysine. Particularly, when polylysine is used, they can be provided with the effect of controlling the growth of decaying bacteria or other organisms in the foods or food materials even after they were thawed or unfrozen and placed in such a state for a certain period of time, in addition to the effects that can be imparted by the addition of the other components.

The process for the preparation of the frozen foods according to the present invention comprises the food-processing step for processing foods or food materials with each of the single components or with a mixture of two or more components, including the alkali metal halide or alkali earth metal halide, the alkali metal bicarbonate or alkali earth metal bicarbonate, and the organic acid with gelatin and the food-freezing step for freezing or refrigerating the processed foods or food materials in cold storage. The process of this invention can produce the frozen foods according to the present invention, which have been provided with the properties as described above.

The food-processing step of the process according to the present invention may additionally include a step of processing the foods or food materials with polylysine by adding polylysine to the solution containing the other components and by contacting the foods or food materials with the solution containing polylysine or by contacting them with a solution of polylysine. Particularly, when polylysine is used, the process according to the present invention can provide the foods or food materials with the properties that can prevent the growth of decaying bacteria or other hazardous organisms therein during cold storage for a prolonged period of time and after thawing the frozen foods or food materials and allowing to stand for a certain period of time.

What is claimed is:

1. A frozen food comprising:
    a food or food material; and
    from 0.1% by weight to 5% by weight of an alkali metal halide or an alkali earth metal halide, from 0.01% by weight to 0.5% by weight of an alkali metal bicarbonate or an alkali earth metal bicarbonate, from 0.0005% by weight to 0.05% by weight of an organic acid, from 0.05% by weight to 10% by weight of gelatin, and from 0.05% by weight to 10% by weight of polylysine, each based on the weight of the food or food material, or a mixture of two or more.

2. The frozen food as claimed in claim 1, wherein:

the alkali metal halide or the alkali earth metal halide is contained at a rate of from 0.2% by weight to 3% by weight based thereon;

the alkali metal bicarbonate or the alkali earth metal bicarbonate is contained at a rate of from 0.05% by weight to 0.3% by weight based thereon;

the organic acid is contained at a rate of from 0.001% by weight to 0.01% by weight based thereon;

polylysine is contained at a rate of 0.1% by weight to 5% by weight based thereon; and gelatin is contained at a rate of from 0.1% by weight to 5% by weight of gelatin based thereon.

3. The frozen food as claimed in claim 1, wherein:

the alkali metal halide or the alkali earth metal halide is contained at a rate of from 0.3% by weight to 2% by weight based on the weight of the food or food material; and the alkali metal bicarbonate or the alkali earth metal bicarbonate is contained at a rate of from 0.1% by weight to 0.2% by weight based thereon.

4. The frozen food as claimed in claim 1, wherein said alkali metal halide is sodium chloride; and said alkali earth metal is magnesium chloride.

5. The frozen food as claimed in claim 1, wherein said alkali metal bicarbonate is sodium bicarbonate.

6. The frozen food as claimed in claim 1, wherein said organic acid is acetic acid, citric acid or lactic acid, or a mixture thereof.

7. A process for preparing a frozen food, comprising:

a food-processing step of treating a food by spraying, coating, immersing, or mixing a food material with a treatment composition comprising from 0.1% by weight to 5% by weight of an alkali metal halide or an alkali earth metal halide, from 0.01% by weight to 0.5% by weight of an alkali metal bicarbonate or an alkali earth metal bicarbonate, from 0.0005% by weight to 0.05% by weight of an organic acid, from 0.05% by weight to 10% by weight of polylysine, and from 0.05% by weight to 10% by weight of gelatin, each based on the weight of the food or food material, or with a mixture of two or more; and a food-freezing step of freezing the food or food material treated by the food-processing step in cold storage.

8. The process as claimed in claim 7, wherein said food or food material is further processed with from 0.1% by weight to 5% by weight of polylysine based on the weight of said food or food material in the food-processing step.

9. The process as claimed in claim 7 or 8, wherein:

said alkali metal halide is sodium chloride; and said alkali earth metal halide is magnesium chloride;

said alkali metal bicarbonate is sodium bicarbonate; and said organic acid is acetic acid, citric acid or lactic acid, or a mixture thereof.

10. A treatment composition for treating food or food material comprising:

an alkali metal halide or an alkali earth metal halide from 0.1% by weight to 5% by weight of the food or food material;

an alkali metal bicarbonate or an alkali earth metal bicarbonate from 0.01% by weight to 0.5% by weight of the food or food material;

an organic acid from 0.0005% by weight to 0.05% by weight of the food or food material;

polylysine from 0.05% by weight to 10% by weight of the food or food material; and gelatin from 0.05% by weight to 10% by weight of the food or food material.

11. The treatment composition as claimed in claim 10, comprising:

the alkali metal halide or the alkali earth metal halide from 0.2% by weight to 3% by weight;

the alkali metal bicarbonate or the alkali earth metal bicarbonate from 0.05% by weight to 0.3% by weight;

the organic acid from 0.001% by weight to 0.01% by weight;

polylysine from 0.1% by weight to 5% by weight; and gelatin from 0.1% by weight to 5% by weight.

12. The treatment composition claimed in claim 10, wherein:

the alkali metal halide or the alkali earth metal halide is contained at a rate of from 0.3% by weight to 2% by weight based thereon; and the alkali metal bicarbonate or the alkali earth metal bicarbonate is contained at a rate of from 0.1% by weight to 0.2% by weight based thereon.

13. The treatment composition as claimed in claim 10, wherein said alkali metal halide is sodium chloride; and said alkali earth metal halide is magnesium chloride.

14. The treatment composition as claimed in claim 10, wherein said alkali metal bicarbonate is sodium bicarbonate.

15. The treatment composition as claimed in claim 10, wherein said organic acid is acetic acid, citric acid or lactic acid, or a mixture thereof.

* * * * *